(12) United States Patent
Tashiro et al.

(10) Patent No.: US 9,254,812 B2
(45) Date of Patent: Feb. 9, 2016

(54) FRONT STRUCTURE OF VEHICLE

(71) Applicant: MAZDA MOTOR CORPORATION, Hiroshima (JP)

(72) Inventors: Kuniyoshi Tashiro, Hiroshima (JP); Arihiro Furumoto, Hiroshima (JP); Ryo Ando, Hiroshima (JP); Masayuki Furutani, Higashihiroshima (JP); Masaru Chikita, Hiroshima (JP); Koji Miyamoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/520,661

(22) Filed: Oct. 22, 2014

(65) Prior Publication Data

US 2015/0136512 A1 May 21, 2015

(30) Foreign Application Priority Data

Nov. 15, 2013 (JP) ................................. 2013-236523

(51) Int. Cl.
*B60R 21/34* (2011.01)
*B60R 19/12* (2006.01)
*B60R 19/18* (2006.01)

(52) U.S. Cl.
CPC ................ *B60R 21/34* (2013.01); *B60R 19/12* (2013.01); *B60R 19/18* (2013.01); *B60R 2019/186* (2013.01)

(58) Field of Classification Search
CPC .. B60R 19/12; B60R 21/34; B60R 2019/186; B60R 19/18
See application file for complete search history.

(56) References Cited

U.S. PATENT DOCUMENTS

| 6,106,039 A * | 8/2000 | Maki .............................. 293/132 |
| 6,676,179 B2 * | 1/2004 | Sato et al. ...................... 293/115 |
| 7,575,259 B2 * | 8/2009 | Hasegawa ...................... 293/120 |
| 2015/0107931 A1 * | 4/2015 | Schmid et al. ................. 180/274 |

FOREIGN PATENT DOCUMENTS

JP    2007-145159 A    6/2007

* cited by examiner

*Primary Examiner* — Faye M Fleming
(74) *Attorney, Agent, or Firm* — Studebaker & Brackett PC

(57) ABSTRACT

A vehicle comprises a bumper reinforcement extending in a vehicle width direction and a shock absorbing member fixed to a front face of the bumper reinforcement and extending in the vehicle width direction along the bumper reinforcement. The shock absorbing member comprises a base portion extending vertically along the front face of the bumper reinforcement and a projection portion extending forward from a lower end portion of the base portion and being resiliently-downward deformable relative to the base portion. Thus, the vehicle comprising the shock absorbing member provided in front of the bumper reinforcement with the leg-flicking function for the pedestrian protection can be provided.

7 Claims, 4 Drawing Sheets

FRONT STRUCTURE OF VEHICLE

BACKGROUND OF THE INVENTION

The present invention relates to a front structure of a vehicle which comprises a shock absorbing member for protecting an object, such as a pedestrian, which is provided between a bumper reinforcement and an exterior member, such as a bumper facia.

A shock absorbing member is generally provided between a bumper reinforcement and a bumper facia for the purpose of protecting an object, particularly a pedestrian. Conventionally, this kind of shock absorbing member is provided over a whole area of a front face of the bumper reinforcement, and the bumper facia is provided to cover the shock absorbing member from the front. However, it has been found that it is preferable to configure such that an attachment position of the shock absorbing member is apart from a knee portion of the pedestrian, specifically, this attachment position is located at a lower level in order to properly reduce a collision impact against a leg portion of the pedestrian. Thus, a structure, in which the shock absorbing member is arranged mainly in a lower area of the front face of the bumper reinforcement so that a lower leg portion of the pedestrian below the knee portion can be supported at the shock absorbing member, whereby the collision impact can be reduced properly in a light collision against the pedestrian, has been recently used (Japanese Patent Laid-Open Publication No. 2007-145159, for example). Further, in this case, the shock absorbing member is configured to project forward relatively greatly so as to provide the sufficient shock-absorbing performance by preventing complete crushing of the shock absorbing member in the light collision. Further, another front structure of a vehicle provided with a shock absorbing member is disclosed in U.S. Pat. No. 6,983,964, for example.

It has been recently considered as measures of protecting the pedestrian in the light collision that the leg portion of the pedestrian is flicked so that the pedestrian can be received on an engine hood (bonnet) in order to reduce the collision impact against the pedestrian properly. Therefore, it is preferable that the vehicle equipped with the above-described shock absorbing member have this leg-flicking function for the pedestrian protection.

SUMMARY OF THE INVENTION

The present invention has been devised in view of the above-described matters, and an object of the present invention is to provide the vehicle comprising the shock absorbing member provided in front of the bumper reinforcement with the leg-flicking function for the pedestrian protection.

According to the present invention, there is provided a front structure of a vehicle, comprising a bumper reinforcement extending in a vehicle width direction, a shock absorbing member fixed to a front face of the bumper reinforcement and extending in the vehicle width direction along the bumper reinforcement, and an exterior member arranged in front of the shock absorbing member, wherein the shock absorbing member comprises a base portion extending vertically along the front face of the bumper reinforcement and a projection portion extending forward from a lower end portion of the base portion, the projection portion being plate-shaped and resiliently-downward deformable relative to the base portion.

According to the present invention, the shock absorbing member, particularly, the projection portion of the shock absorbing member deforms resiliently in the light collision against the pedestrian, so that the collision impact is absorbed and thereby the impact against the pedestrian can be reduced properly. In this case, since the shock absorbing member is configured to have an L-shaped cross section (i.e., the shock absorbing member comprises the base portion extending vertically and the projection portion extending forward from the lower end portion of the base portion), the projection portion of the shock absorbing member is so deformable downward that a resilient upward-reaction force can be generated at the projection portion properly. This resilient upward-reaction force of the projection portion can promote the leg-flicking function of the pedestrian.

According to an embodiment of the present invention, the base portion is configured such that both end portions thereof in the vehicle width direction have a greater vertical width than the other portion of the base portion which is positioned inward from the both end portions and have a harder hardness than the other portion of the base portion. Thereby, in the light collision against the pedestrian, the leg portion of the pedestrian is softly received at the central portion of the shock absorbing member and also it is effectively prevented that the base portion and the projection portion incline forward together. Accordingly, the projection portion can be properly made to deform resiliently in the light collision against the pedestrian, so that the leg portion of the pedestrian can be flicked up by the resilient upward-reaction force of the projection portion.

According to another embodiment of the present invention, the base portion is configured such that a central portion thereof in the vehicle width direction have a smaller vertical width than the other portion of the base portion which is positioned outward from the central portion. Thereby, the leg portion of the pedestrian is possibly made to incline rearward deeply in the light collision against the pedestrian, so that the projection portion of the shock absorbing member can be made to deform downward more surely. In other words, the force for flicking up the leg portion of the pedestrian can be generated more surely. In this case, it is preferable that the bumper reinforcement, the shock absorbing member and the exterior member be formed in a curve shape such that respective central portions thereof project forward relative to respective both end portions thereof.

According to another embodiment of the present invention, the above-described front structure of a vehicle further comprises a leg-flicking member to flick a leg of a pedestrian when the pedestrian hits against the vehicle, the leg-flicking member being provided below the bumper reinforcement to extend forward beyond the shock absorbing member. Thereby, since the leg portion of the pedestrian is flicked by the leg-flicking member in advance in the light collision against the pedestrian, the rearward inclining of the leg portion of the pedestrian is promoted, so that the projection portion of the shock absorbing member can be made to deform downward more properly. Accordingly, the force for flicking up the leg portion can be caused by the leg portion of the pedestrian more surely.

Herein, it is preferable that the above-described projection portion of the shock absorbing member be configured to be deformable downward below a lower end of the bumper reinforcement.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
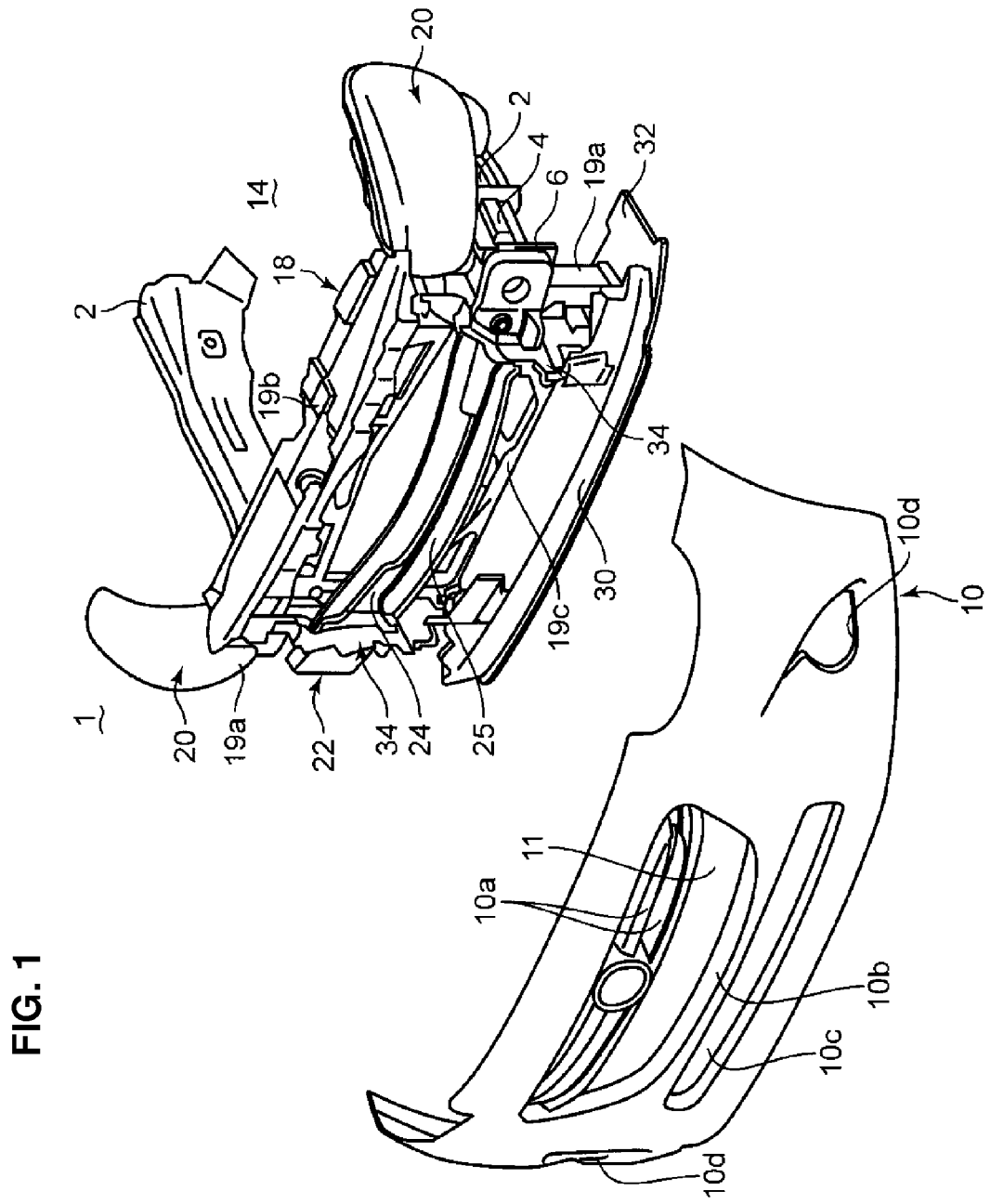
FIG. 1 is a perspective view showing a front portion of a vehicle (in a state in which a bumper facia is separated), to which a front structure of a vehicle according to the present invention is applied.
Figure 2:
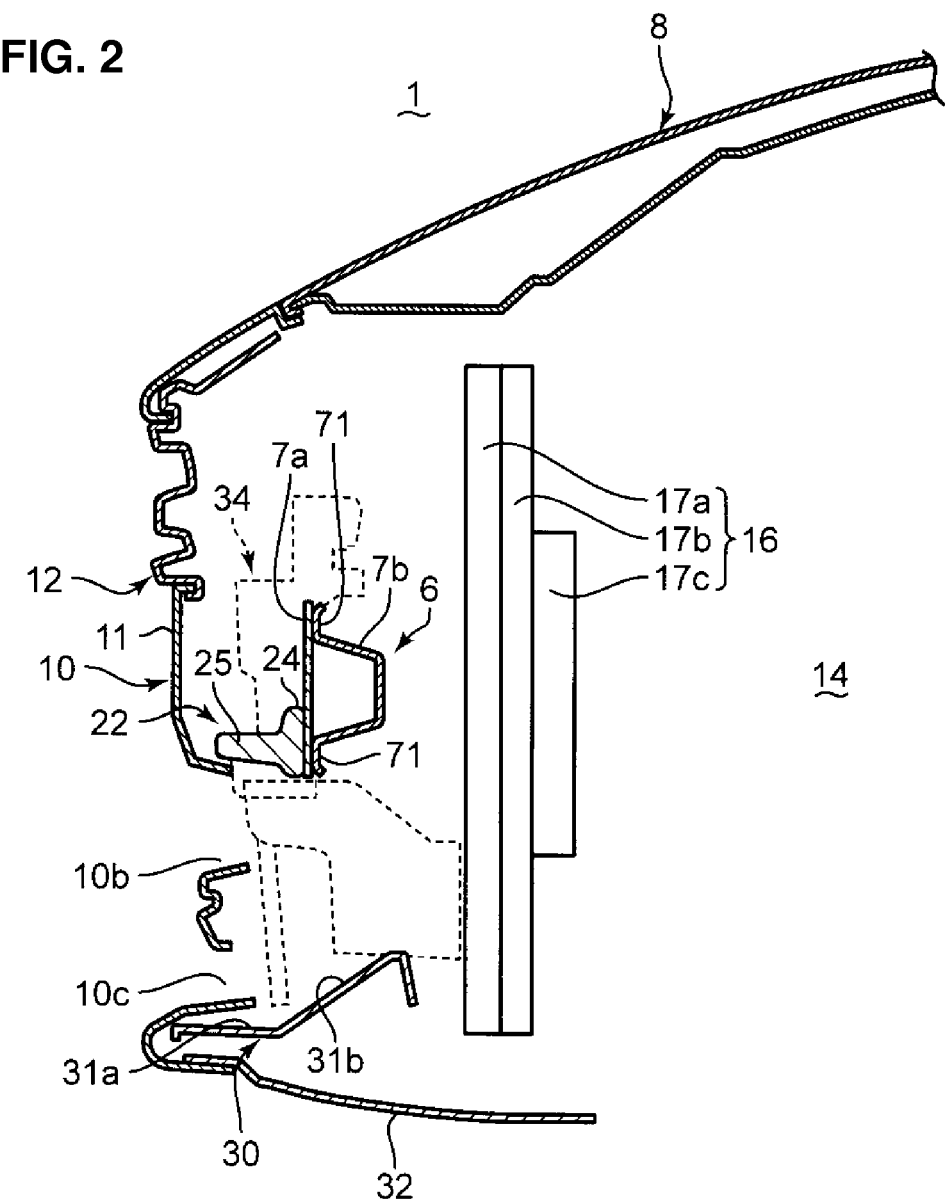
FIG. 2 is a sectional view showing the front structure of the vehicle.

As shown in FIG. 1, a vehicle (automotive vehicle) 1 comprises, as a main structural body of a vehicle's front portion, a pair of right-and-left front side frames 2 which extend longitudinally, a pair of crash cans 4 which are connected to respective front end portions of the front side frames 2, and a front bumper reinforcement 6 (hereinafter, referred to as the bumper reinforcement 6) which is fixed to the front end portions of the front side frames 2 via the crash cans 4 and constitutes a framework of a front bumper. As shown in FIG. 2, the vehicle 1 further comprises, as a member forming an outer surface of the vehicle's front portion, an engine hood (bonnet) 8 which forms an upper face of the vehicle's front portion, a front bumper facia 10 (hereinafter, referred to as the bumper facia 10, which corresponds to an exterior member) which forms an outer surface of a vehicle's front end and also an outer surface of the front bumper, and right-and-left front fender panels (not illustrated) which form an outer surface of vehicle's side portions. An engine room 14 is formed inside the members forming the outer surface, such as the engine hood 8. An engine and others, not illustrated, are stored in the engine room 14, and a radiator 16 to cool cooling water of the engine is arranged in front of the engine. The radiator 16 includes a condenser 17a, a radiator body 17b, a radiator fan 17c and so on, and is fixed to a vehicle body via a radiator shroud 18.

As shown in FIG. 1, the radiator shroud 18 comprises a pair of vertical side portions 19a which are positioned on both sides of the radiator 16, an upper side portion 19b which interconnects upper end portions of the pair of vertical side portions 19a, and a lower side portion 19c which interconnects lower end portions of the pair of vertical side portions 19a, which is formed substantially in a rectangular shape in the elevational view. The radiator 16 is arranged inside the radiator shroud 18 when viewed from the front of the vehicle 1, and fixed to the above-described vertical side portions 19a and the others directly or indirectly via brackets and the like. Herein, the radiator shroud 18 further comprises fixation arm portions, not illustrated, which extend outward and rearward from right-and-left both ends of the upper side portion 19b and are fixed to an apron reinforcement, and a pair of right-and-left head lamp units 20 are fixed to the fixation arm portions.

Herein, the radiator shroud 18 may be attached apart from the apron reinforcement so as to retreat integrally with the bumper reinforcement 6 in the collision.

As shown in FIG. 1, a lower stiffener 30 as a leg-flicking member for the pedestrian is fixed to respective front faces of the vertical side portions 19a and the lower side portion 19c of the radiator shroud 18. A tip portion of the lower stiffener 30 projects forward beyond a shock absorbing member 22, which will be described later, and a bumper cover 11, which will be described later, which is positioned in front of the shock absorbing member 22 (see FIG. 2). Thereby, in the light collision against the pedestrian, the lower stiffener 30 flicks the pedestrian's leg, so that the pedestrian is received on the engine hood 8. Accordingly, the collision impact against the pedestrian is reduced. Herein, while illustration is omitted, the engine hood 8 is provided with a collision-impact reducing means for reducing the collision impact against the pedestrian when receiving the pedestrian. This collision-impact reducing means may be constituted by providing a sufficient crash stroke between the engine hood 8 and the engine and the others or by an airbag mechanism. The lower stiffener 30 comprises, as shown in FIG. 2, a front side portion 31a which extends substantially horizontally and a rear side portion 31b which extends obliquely upward from a rear end of the front side portion 31a. This lower stiffener 30 functions as a guide member to guide the traveling air coming in through a lower-side opening portion, which will be described later, of the bumper facia 10 toward the radiator 16 along the rear side portion 31b during the vehicle's traveling, too.

Herein, an under cover 32 is fixed to the lower end portions of the pair of vertical side portions 19. The under cover 32 covers some area of the vehicle's front portion from below so that the radiator 16 and the like can be protected thereby.

The shock absorbing member for impact absorption 22 is fixed to the bumper reinforcement 6. In the present vehicle 1, the front bumper is constituted by the shock absorbing 22, the bumper reinforcement 6, the bumper facia 10 (including a bumper cover 11 which will be described later) and so on.

Figure 3:
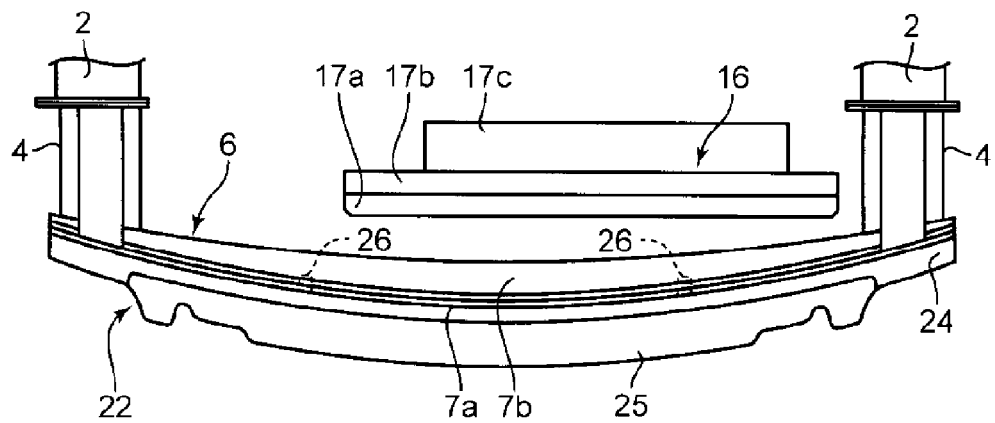
FIG. 3 is a schematic plan view showing a specific structure of the front portion of the vehicle.
Figure 4:
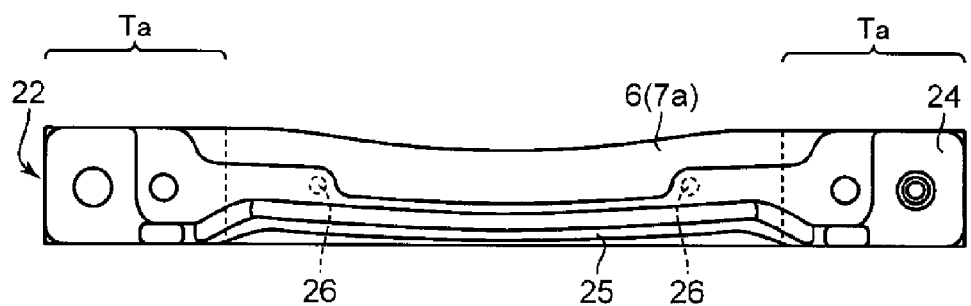
FIG. 4 is an elevational view showing a shock absorbing member.

As shown in FIGS. 2 and 3, the bumper reinforcement 6 is a slender structural member which extends in a vehicle width direction and has a closed cross section. This bumper reinforcement 6 comprises a front side member 7a which is of a rectangular plate shape and a rear side member 7b which has a hat-shaped cross section and is joined to a rear face of the front side member 7a via upper-and-lower flange portions 71. The front side member 7a and the rear side member 7b are made from a material having light weight and high rigidity, especially high-tension steel plate or carbon-fiber reinforced resin in the present embodiment. The bumper reinforcement 6 has a vertical width which can provide a sufficient strength enough to endure the collision impact in a vehicle frontal collision according to the safety standards or the like. Further, the bumper reinforcement 6 is formed in a curve shape in the plan view such that a central portion, in the vehicle width direction, of the front face thereof (the front face of the front side member 7a) projects forward relative to both end portions of the front face thereof. The both end portions of the bumper reinforcement 6 are fixed to the front end portions of the front side frames 2 via the above-described crash cans 4. As shown in FIG. 4, the bumper reinforcement 6 has an upper edge portion, a central area, in the vehicle width direction, of which is slightly concaved in a V shape.

The shock absorbing member 22 is a member to reduce the collision impact which the object, such as the pedestrian, receives, by absorbing the collision load. The shock absorbing member 22 is provided between an inner face of the bumper facia 10 and the bumper reinforcement 6, and fixed to the front face of the front side member 7a of the bumper reinforcement 6.

The shock absorbing member 22 comprises, as shown in FIGS. 2-4, a base portion 24 which extends in the vehicle width direction along the front face of the bumper reinforcement 6 (the front side member 7a) and a plate-shaped projection portion 25 which projects forward from a lower end of the front face of the base portion 24 and extends in the vehicle width direction, and has substantially an L-shaped cross section. The shock absorbing member 22 is formed in a curve shape in a plan view such that its central portion projects forward relative to its both end portions. The shock absorbing member 22 is arranged along the front face (the front side member 7a) of the bumper reinforcement 6 and fixed to the bumper reinforcement 6. Specifically, a pair of boss portions for fixation 26 are provided at outward positions, in the vehicle width direction, of a central portion of a rear face of the shock absorbing member 22. These boss portions for fixation 26 are inserted into attachment holes, not illustrated, formed at the bumper reinforcement 6 (the front side member 7a), whereby the shock absorbing member 22 is fixed to the bumper reinforcement 6.

An entire part of the shock absorbing member 22 is made of a resilient body which is made from a foamed-resin material or the like, so that the shock absorbing member 22 is configured such that the projection portion 25 is resiliently deformable vertically relative to the base portion 24. Particularly, since the shock absorbing member 22 has the L-shaped cross section such that the projection portion 25 projects forward from the lower end portion of the base portion 24 as described above, and the projection portion 25 of the shock absorbing member 22 is configured such that its central portion bends downward slightly when viewed from the front of the vehicle as shown in FIG. 4, the shock absorbing member 22 is configured to be easily deformable downward in the light collision against the pedestrian or the like.

Figure 5:
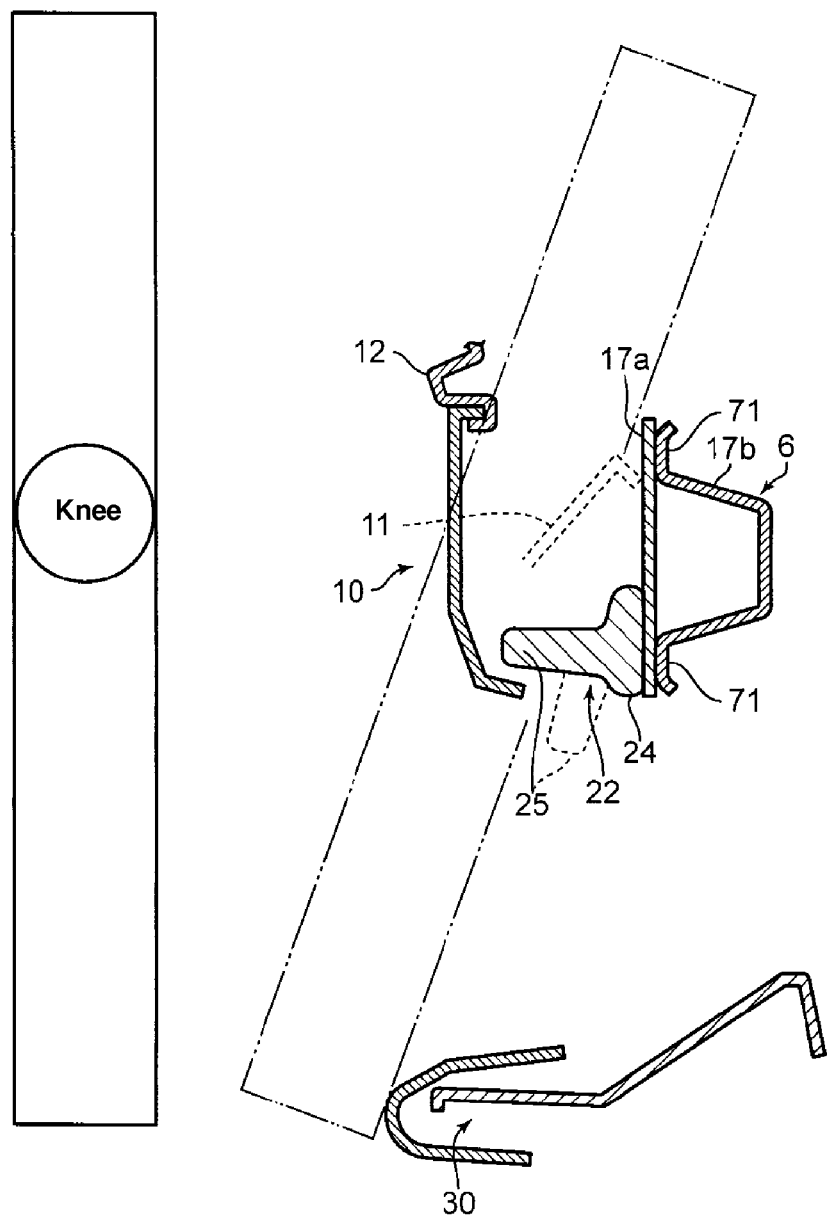
FIG. 5 is a major-part sectional view of the vehicle, which explains a deformation state of the shock absorbing member in a light collision.

Further, as shown in this figure, the base portion 24 of the shock absorbing member 22 is configured such that its both end portions in the vehicle width direction have substantially the same vertical width as the bumper reinforcement 6, whereas its specified area which is positioned inward from its both end portions (including the central portion of the base portion 24 in the vehicle width direction) has a smaller vertical width than the bumper reinforcement 6. Thus, the base portion 24 is configured such that its central portion is concaved downward in the elevational view of the vehicle. And, since the projection portion 25 is formed at the lower end of the base portion 24 as described above, the projection portion 25 is positioned near the lower end of the front face of the bumper reinforcement 6. That is, as shown in FIG. 5 with a leg model, the projection portion 25 is provided near the lower end of the front face of the bumper reinforcement 6 such that it is downward apart from a knee portion of the pedestrian. Thereby, the collision impact against the knee portion of the pedestrian in the light collision can be properly reduced.

Herein, the projection portion 25 is provided not over the entire area of the shock absorbing member 22 in the vehicle width direction, but at a specified area which is positioned inward from the right and left crash canes 4 when viewed from the front of the vehicle. Further, the both end portions of the shock absorbing member 22 in the vehicle width direction, specifically, its specified areas (areas Ta in FIG. 4) including areas positioned in front of the crash cans 4, have a harder hardness than the other inward portion. In the present embodiment, the foam ratio of the foamed-resin material at the areas Ta is set to be lower than that of the foamed-resin material at the other inward portion, so that the both end portions (the areas Ta) of the shock absorbing member 22 are configured to be harder. That is, in the light collision against the pedestrian, the projection portion 25 deforms resiliently and absorbs the collision impact, so that the collision impact which the pedestrian receives can be reduced. Meanwhile, in a heavier collision, the collision impact is quickly transmitted to the crash cans 4 and the crash cans 4 deform plastically, thereby absorbing the collision impact. Further, since the both end portions of the base portion 23 of the shock absorbing member 22 have the greater vertical width and curve (slant rearward), the collision impact which the pedestrian or the like receives in the light collision can be reduced properly.

The bumper facia 10 constitutes a relatively large area of the outer surface of the front end portion of the vehicle 1. As shown in FIG. 1, a laterally-long opening portion to introduce traveling air (outside air) into the engine room 14 is formed at a central portion of the bumper facia 10 in the vehicle width direction. Specifically, a band-shaped bumper cover 11 which is positioned in front of the bumper reinforcement 6 and extends in the vehicle width direction is provided integrally substantially at a central portion, in the vertical direction, of the bumper facia 10. An upper-side opening portion 10a is formed at an upper portion of the bumper facia 10 above the bumper cover 11, and a central opening portion 10b is formed at a central portion of the bumper facia 10 below the bumper cover 11. Further, a lower-side opening portion 10c which is longer than the opening portions 10a, 10b in the vehicle width direction is formed at a lower portion of the bumper facia 10 below the central opening portion 10b. Thus, while the vehicle 1 travels, the traveling air is introduced through the upper-side opening portion 10a into the radiator 16, passing above the bumper reinforcement 6, and also introduced through the central opening portion 10b and the lower-side opening portion 10c into the radiator 16, passing below the bumper reinforcement 6. Thus, cooling of the radiator 16 is promoted by the traveling air (outside air) introduced through the opening portions 10a-10c.

As shown in FIG. 2, the vertical width of the bumper cover 11 is substantially equal to the vertical width of the front side member 7a, and the bumper cover 11 is provided substantially in parallel to the font side member 7a of the bumper reinforcement 6 in a state in which the bumper cover 11 faces the front side member 7a with the shock absorbing interposed between the bumper cover 11 and the front side member 7a. Thus, the projection portion 25 of the shock absorbing member 22 is arranged close to the inner face of the bumper cover 11 in a state in which the projection portion 25 faces the lower end portion of the inner face of the bumper cover 11. Herein, the upper portion of the bumper facia 10 above the bumper cover 11, that is, a grill portion 12 where the upper-side opening portion 10a is formed projects forward beyond the bumper cover 11.

Moreover, as shown in FIG. 1, right-and-left opening portions 10d to provide a fog-lamp unit, not illustrated, are formed at both ends of the bumper facia 10 in the vehicle width direction.

While no specific illustration is provided, the bumper facia 10 is formed in a shape along the bumper reinforcement 6 and the shock absorbing member 22, that is, in a curve shape such that its central portion projects forward relative to its both end portions in a plan view.

Herein, right-and-left partitioning members 34 are provided between the inner face of the bumper facia 10 and the bumper reinforcement 6. The right-and-left partitioning members 34 are members to prevent the traveling air introduced through the above-described opening portions 10a-10c from escaping to a periphery of the radiator 16, particularly, from escaping in the vehicle width direction along the shock absorbing member 22. Thereby, the traveling air being introduced through the opening portions 10a-10c is effectively utilized for the cooling of the radiator.

Hereafter, operations and effects of the front structure of the vehicle 1 described above will be described.

According to the front structure of the vehicle 1 described above, the shock absorbing member 22, particularly, the projection portion 25 of the shock absorbing member 22 deforms resiliently in the light collision against the pedestrian, so that the collision impact is absorbed and thereby the impact against the pedestrian can be reduced properly. In this case, the shock absorbing member 22 is configured to have the L-shaped cross section by comprising the base portion 24 extending vertically and the projection portion 25 extending forward from the lower end portion of the base portion 24, and the central portion, in the vehicle width direction, of the projection portion 25 is configured to bend downward slightly when viewed from the front of the vehicle 1, so that the projection portion 25 is easily deformable downward in the light collision against the pedestrian or the like. Accordingly, the projection portion 25 bends downward in the light collision against the pedestrian, and the resilient upward-reaction force generated by this downward bending of the projection portion 25 functions as a force for flicking up the knee portion of the pedestrian.

The present vehicle 1 comprises the lower stiffener 30 at the lower portion of the front portion of the vehicle 1 as described above, which positively causes the leg flicking of the pedestrian in the light collision against the pedestrian. Herein, since the force for the leg flicking generated by the projection portion 25 acts on the pedestrian as described above, the leg flicking of the pedestrian can be promoted. Accordingly, the leg flicking of the pedestrian is caused more surely and quickly in the light collision against the pedestrian, so that the pedestrian can be properly received on the engine hood.

Particularly, according to the front structure of the vehicle 1, since the position of the bumper cover 11 is set such that the projection portion 25 faces the position near the lower end portion of the inner face of the bumper cover 11, and the grill portion 12 positioned above the bumper cover 11 projects forward beyond the bumper cover 11, the projection portion 25 can be made to bend downward more surely in the light collision against the pedestrian. That is, when the lower stiffener 30 contacts the leg portion of the pedestrian and then flicks the leg portion, the position of the pedestrian is made to incline rearward and then the bumper facia 10 deforms. In this case, the grill portion 12 contacts the pedestrian and deforms rearward first, and then the bumper cover 11 deforms such that it inclines rearward accordingly. Accordingly, the projection portion 25 is pressed down from above by this inclination of the bumper cover 11 as shown by a broken line in FIG. 5. Consequently, the projection portion 25 can be made to bend downward more surely in the light collision against the pedestrian.

Further, since the shock absorbing member 22 is configured such that the central area, in the vehicle width direction, of the base portion 24 is concaved downward in the elevational view of the vehicle, the leg portion of the pedestrian can be made to incline more deeply. The bumper reinforcement 6 is also configured such that it central area is concaved downward, so that the same thing happens. That is, since the leg portion of the pedestrian is allowed to incline more deeply as described above, the projection portion 25 can be made to bend downward more surely.

Also, since the base portion 24 of the shock absorbing member 22 is configured such that its both end portions in the vehicle width direction corresponding to the area (the area Ta in FIG. 4) of the both ends of the shock absorbing member 22 positioned in front of the crash cans 4 have the greater vertical width and have the harder hardness, the leg portion of the pedestrian is softly received at the central portion of the shock absorbing member 22 and also it is effectively prevented that the base portion 24 and the projection portion 25 incline forward together in the light collision against the pedestrian. Accordingly, the projection portion 25 can be properly made to deform resiliently in the light collision against the pedestrian, so that the leg portion of the pedestrian can be flicked up by the resilient upward-reaction force of the projection portion 25.

Additionally, in the present embodiment, as shown in FIG. 5, the projection portion 25 of the shock absorbing member 22 is configured to be deformable downward below a lower end of the bumper reinforcement 6. Thus, in a case in which the vehicle 1 collides with a heavy object, such as a wall, the projection portion 25 deforms downward below the lower end of the bumper reinforcement 6. Accordingly, a portion of the shock absorbing member 22 which comes to be interposed between the heavy object and the bumper reinforcement 6 is made as small as possible, so that the central portion of the bumper reinforcement 6 in the vehicle width direction which corresponds to an un-deformed portion of the shock absorbing member 22 can be suppressed from being pushed rearward. Thereby, a crash space between the bumper reinforcement 6 and an auxiliary equipment (parts) disposed behind the bumper reinforcement 6 can be smaller, so that the vehicle body can be properly compact. This is particularly effective in decreasing the amount (degree) of pushing back of the central portion of the bumper reinforcement 6 which occurs until the heavy object comes to contact the portion of the bumper reinforcement 6 positioned in front of the crash cans 4 in a case in which the bumper reinforcement 6 is configured such that its central portion projects forward so as to hit against the heavy object previously than the above-described portion positioned in front of the crash cans 4 does.

The present invention should not be limited to the above-described embodiment, and any other modifications and improvements may be applied within the scope of a sprit of the present invention.

What is claimed is:

1. A front structure of a vehicle, comprising:
   a bumper reinforcement extending in a vehicle width direction;
   a shock absorbing member fixed to a front face of the bumper reinforcement and extending in the vehicle width direction along the bumper reinforcement; and
   an exterior member arranged in front of the shock absorbing member,
   wherein said shock absorbing member comprises a base portion extending vertically along the front face of said bumper reinforcement and a projection portion extending forward from a lower end portion of the base portion, the projection portion being plate-shaped and resiliently-downward deformable relative to the base portion,
   said base portion is configured such that both end portions thereof in the vehicle width direction have a greater vertical width than the other portion of the base portion which is positioned inward from the both end portions and have a harder hardness than the other portion of the base portion.

2. The front structure of a vehicle of claim 1, wherein said base portion is configured such that a central portion thereof in the vehicle width direction have a smaller vertical width than the other portion of the base portion which is positioned outward from the central portion.

3. The front structure of a vehicle of claim 2, wherein said bumper reinforcement, shock absorbing member and exterior member are formed in a curve shape such that respective central portions thereof project forward relative to respective both end portions thereof.

4. The front structure of a vehicle of claim 3, further comprising a leg-flicking member to flick a leg of a pedestrian when the pedestrian hits against the vehicle, the leg-flicking member being provided below said bumper reinforcement to extend forward beyond the shock absorbing member.

5. The front structure of a vehicle of claim 1, wherein said projection portion is configured to be deformable downward below a lower end of the bumper reinforcement.

6. A front structure of a vehicle, comprising:
a bumper reinforcement extending in a vehicle width direction;
a shock absorbing member fixed to a front face of the bumper reinforcement and extending in the vehicle width direction along the bumper reinforcement;
an exterior member arranged in front of the shock absorbing member, and
a leg-flicking member to flick a leg of a pedestrian when the pedestrian hits against the vehicle, the leg-flicking member being provided below said bumper reinforcement to extend forward beyond the shock absorbing member,
wherein said shock absorbing member comprises a base portion extending vertically along the front face of said bumper reinforcement and a projection portion extending forward from a lower end portion of the base portion, the projection portion being plate-shaped and resiliently-downward deformable relative to the base portion.

7. A front structure of a vehicle, comprising:
a bumper reinforcement extending in a vehicle width direction;
a shock absorbing member fixed to a front face of the bumper reinforcement and extending in the vehicle width direction along the bumper reinforcement; and
an exterior member arranged in front of the shock absorbing member,
wherein said shock absorbing member comprises a base portion extending vertically along the front face of said bumper reinforcement and a projection portion extending forward from a lower end portion of the base portion, the projection portion being plate-shaped and resiliently-downward deformable relative to the base portion,
said projection portion is configured to be deformable downward below a lower end of the bumper reinforcement.

* * * * *